(12) United States Patent
Nishide

(10) Patent No.: US 6,412,876 B2
(45) Date of Patent: Jul. 2, 2002

(54) SEAT BELT STORING STRUCTURE

(75) Inventor: Harutomi Nishide, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/726,547

(22) Filed: Dec. 1, 2000

(51) Int. Cl.⁷ .......................... A47C 31/00; A47D 15/00
(52) U.S. Cl. .................. 297/482; 297/481; 297/188.01
(58) Field of Search ................................. 297/482, 481, 297/188.01, 188.19

(56) References Cited

U.S. PATENT DOCUMENTS

| | | | | |
|---|---|---|---|---|
| 4,560,203 A | * | 12/1985 | Huber | ......................... 297/481 |
| 4,810,037 A | * | 3/1989 | Takagi | ......................... 297/481 |
| 5,009,469 A | * | 4/1991 | Mouri | ..................... 297/481 X |
| 5,044,695 A | * | 9/1991 | Tsuchiya | ..................... 297/481 |
| 5,139,311 A | * | 8/1992 | Imai et al. | ................... 297/481 |
| 5,158,339 A | * | 10/1992 | Miyanaga | ................... 297/482 |

FOREIGN PATENT DOCUMENTS

| | | |
|---|---|---|
| DE | 1 210 701 | 2/1966 |
| DE | 29 31 552 | 2/1981 |
| DE | 40 37 574 A1 | 5/1991 |

* cited by examiner

Primary Examiner—Peter M. Cuomo
Assistant Examiner—Rodney B. White
(74) Attorney, Agent, or Firm—Arent Fox Kintner Plotkin & Kahn, PLLC

(57) ABSTRACT

A belt storing bag 25 for storing a belt and a tongue plate 28 of a seat belt 16 is provided so as to be attached to a seat cushion back 24 of an automotive seat 11 comprising a seat cushion 21 and a seat back 13.

5 Claims, 5 Drawing Sheets

SEAT BELT STORING STRUCTURE

BACKGROUND OF THE INVENTION

1. Field of the Invention

The present invention relates to a seat belt storing structure.

2. Description of the Related Art

FIG. 5 is a perspective view of a conventional bench seat. The bench seat 101 that can accommodate three people at the maximum is provided with a seat belt 102 for a passenger seated in a left-hand side seat, a seat belt 103 for a passenger seated in a right-hand side seat and a seat belt 104 for a passenger seated in a central seat, and the left- and right-hand side seat belts 102, 103 are a so-called lap and shoulder or three point seat belt, which is constructed so as to be retracted into a retractor (not shown) when not in use. On the other hand, the center seat belt 104 is a so-called lap or two point seat belt, which is stored in a seat belt storing bag 105 when not in use.

This seat belt storing bag is sewn using the same material as that used for the skin of the seat 101, and in a case where the seat 101 comprises a seat cushion 106 and a seat back 107 provided rearward of the seat cushion 106 and is a bench seat provided with a left-hand side seat 108, a right-hand seat 109 and a center seat 111, the seat belt storing bag 105 is conventionally provided on a seat surface 112 of the center seat 111.

However, providing the seat belt storing bag 105 on the seat surface 112 of the center seat 111 deteriorates the external appearance of the seat. In addition, the seat belt bag 105 touches the hip of the seated passenger (even when the bag is empty), and the seated comfort is also deteriorated.

Moreover, when the seat is caused to slide longitudinally or rotate, there may be a risk that the seat belt pops or suspends out of the bag.

In addition, the seat belt storing bag 105 needs to be sewn using the same material as that used for the skin of the seat 101. This increases the use of the expensive texture and requires a process for sewing seat belt storing bags 105, thereby increasing the production cost.

SUMMARY OF THE INVENTION

To this end, an object of the invention is to provide a seat belt storing bag which can preserve the external appearance and seated comfort of a seat, prevent the popping out of the seat belt and reduce the production cost.

With a view to attaining the object, according to a first aspect of the invention, there is provided a seat belt storing structure, wherein a belt storing bag for storing a belt and a tongue plate of a seat belt is provided so as to be attached to the back of a seat cushion of an automotive seat comprising the seat cushion and a seat back.

The belt storing bag is provided so as to be attached to the back of the seat cushion of the automotive seat. When the seat belt is not in use, the belt and the tongue plate of the seat belt are stored together in the belt storing bag. As a result, it is avoided that both the belt and the tongue plate are placed on the seat cushion, the external appearance of the automotive seat being thereby preserved.

Additionally, since nothing is placed on the seat cushion, there is no risk that something touches the hip of the seated passenger, the seated comfort being thereby preserved.

The belt storing bag is provided so as to be attached to the back of the seat cushion, so that the belt storing bag is made to be located close to a lower anchorage of the seat belt. As a result, the belt can be stored in the belt storing bag as far as a portion in the vicinity of the anchorage, this preventing the popping out of the seat belt (belt).

Furthermore, since the belt storing bag is located on the back of the seat cushion and hence is concealed from the front, there is no need to use a decorative skin material or fabric, and hence a fabric material of lower grade may be used, this eventually leading to the reduction in production cost.

DETAILED DESCRIPTION OF THE PREFERRED EMBODIMENTS

Figure 1:
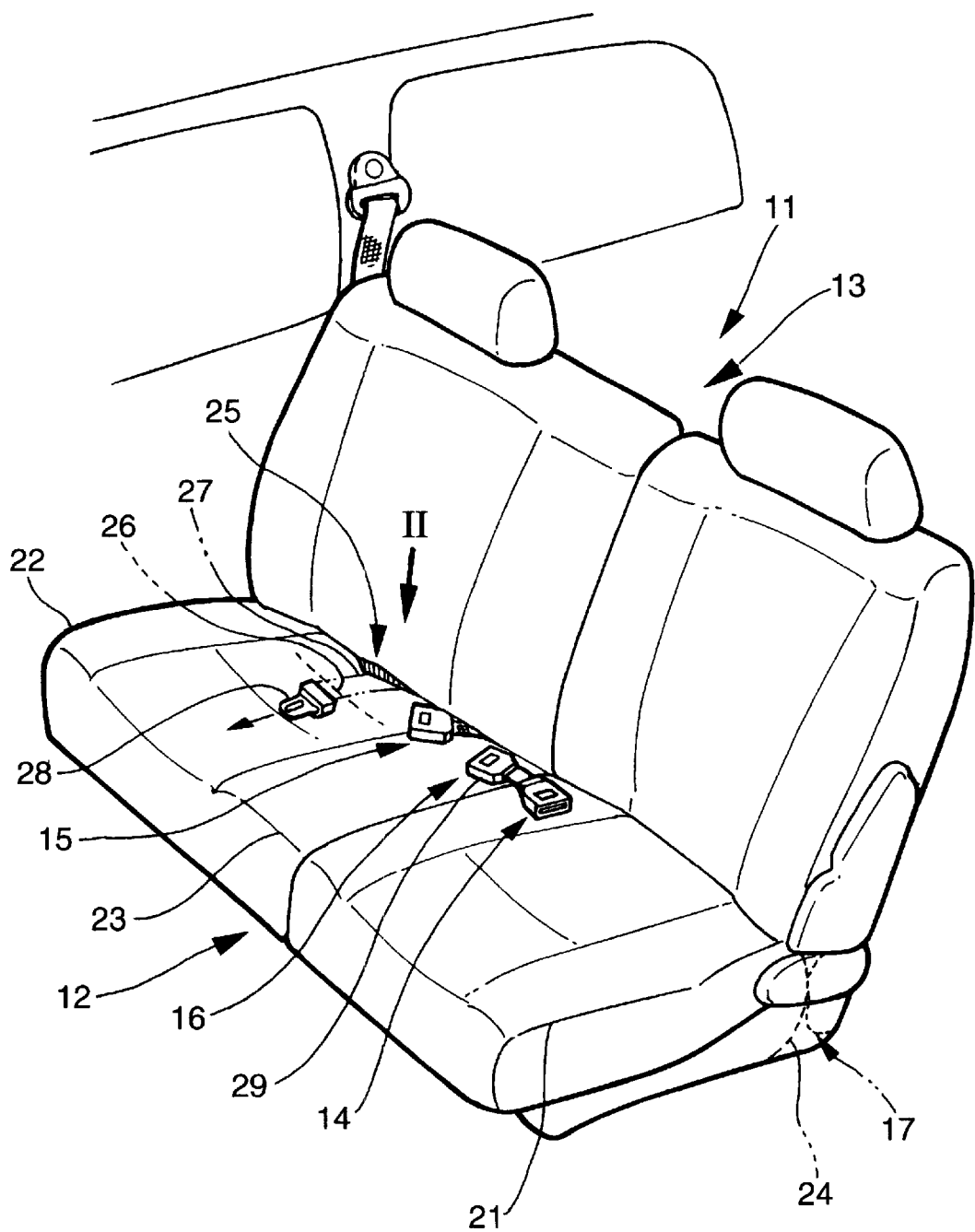
FIG. 1 is a perspective view of a seat provided with a seat belt storing structure according to the invention.

An embodiment of the invention will be described below with reference to the accompanying drawings. Note that the drawings are to be viewed in a direction in which reference numerals are oriented.

FIG. 1 is a perspective view of a seat provided with a seat belt storing structure according to the invention, and the automotive seat 11 is a bench seat including a seat cushion 12 and a seat back 13 provided at the rear of the seat cushion 12. Reference numeral 14 denotes a seat belt for a left-hand side seat; 15: a seat belt for a right-hand side seat; 16: a seat belt for a center seat; and 17: a rear portion of the seat cushion.

The seat cushion 12 includes a left-hand seat 21, a right-hand seat 22 and a center seat 23, and a belt storing bag 25 is provided so as to be attached to the back 24 of the seat cushion.

The seat belt 16 is a two point seat belt including a seat belt lower attaching portion 26 attached to a lower portion on the back of the seat cushion 12, a webbing 27 which is a belt of the seat belt attached to the lower attaching portion 26 at one end thereof, a tongue plate 28 attached to the other end of the webbing 27 and a buckle 29 for connecting the tongue plate 28. Note that when the seat belt 16 is put in use, the belt 16 is pulled out of the belt storing bag 25 as indicated by an arrow.

The webbing 27 is a belt-like member formed of fibers.

Figure 2:
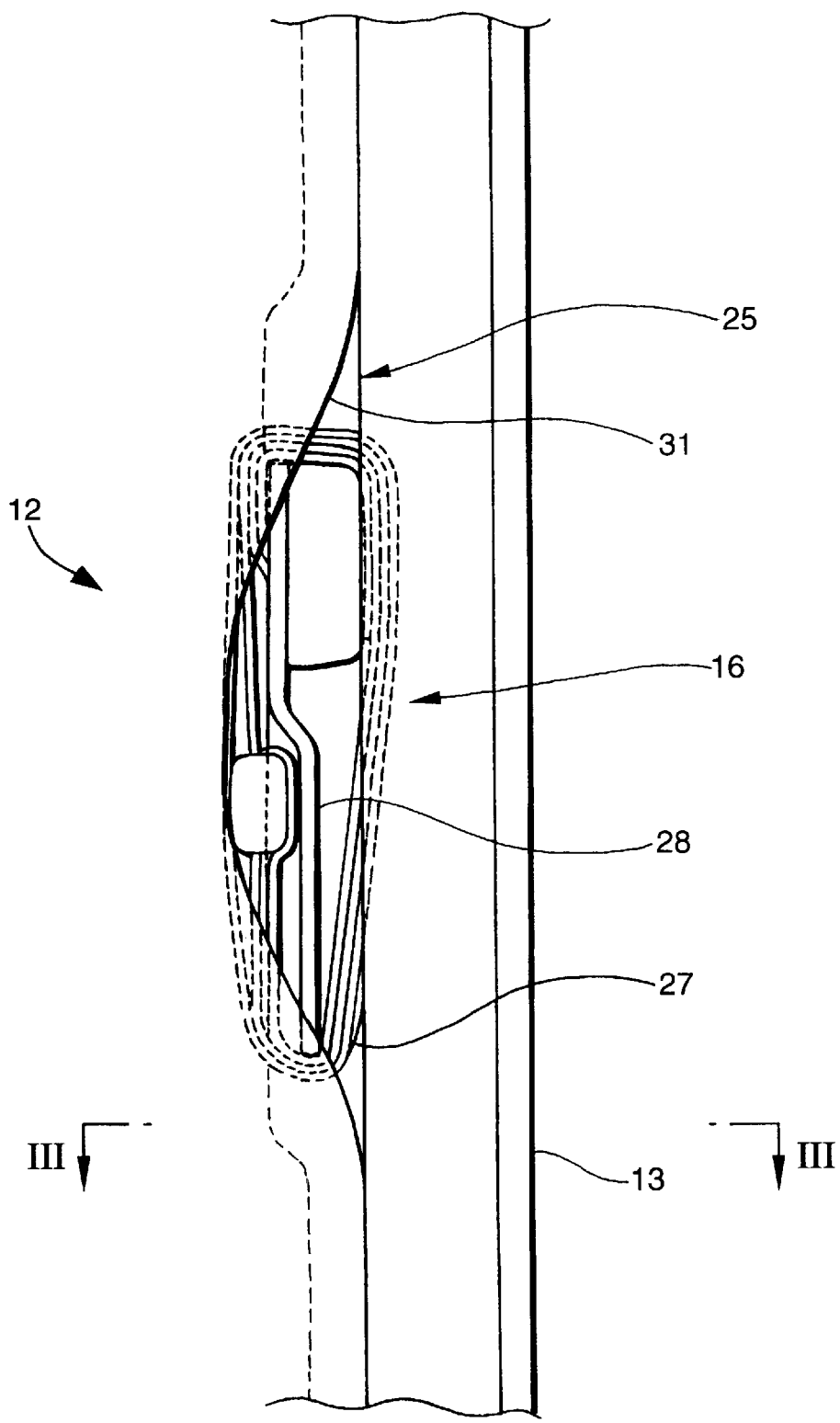
FIG. 2 is a view as viewed in a direction indicated by an arrow II in FIG. 1.

FIG. 2 is an enlarged view as viewed indicated by an arrow II of FIG. 1, showing a state in which the webbing 27 and the tongue plate 28 of the seat belt 16 is stored in the belt storing bag 25 with a part thereof being covered with a cover portion 31 of the seat cushion 12.

In addition, in storing the webbing 27, the webbing 27 is wound around the tongue plate 28 as a core and the webbing 27 and the tongue plate 28 are stored in the belt storing bag 25 as an integral unit.

The desirable length of the belt storing bag 25 is an aggregate length of a length resulting when the webbing 27 is wound around the tongue plate 28 and an extra length allowing the egress and ingress of the fingers.

Providing the cover portion 31 can cover the extra portion, whereby the external appearance of the seat is improved.

Figure 3:
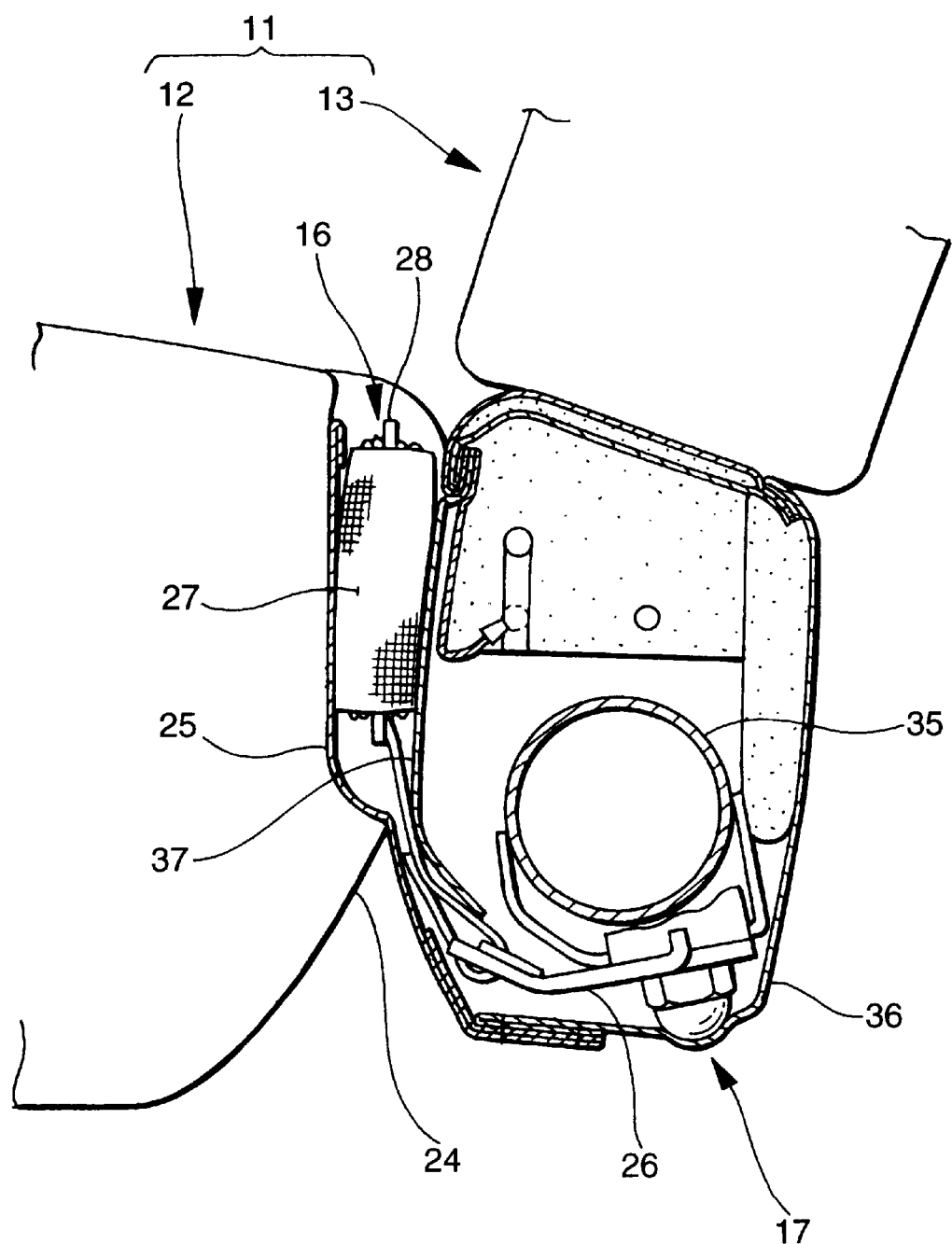
FIG. 3 is a sectional view as taken along the line III—III in FIG. 2.

FIG. 3 is a sectional view taken along the line III—III of FIG. 2, showing a state in which the belt storing bag 25 for storing the seat belt 16 and an the tongue plate 28 is provided so as to be attached to the back 24 of the seat cushion 12 of the automotive seat 11 including the seat cushion 12 and the seat back 13 and in which a seat cushion rear portion 17 is disposed rearward of the seat cushion 12.

The seat cushion rear portion 17 includes a pipe 35, the lower attaching portion 26 attached to the pipe 35, a cover 36 for covering the lower attaching portion 26 and the belt storing bag 25 formed on a front side 37 of the cover 36.

Based on the tongue plate 28, the depth of the belt storing bag 25 is a depth allowing the tongue plate 28 to be fully stored therein. In addition, the width of the belt storing bag 25 is a width which is substantially equal to a width resulting when the webbing 27 is wound around the tongue plate 28. As a result, a space required for the belt storing bag 25 can be saved, the seated comfort being thereby preserved.

An operation of the seat belt storing structure described heretofore will be described below.

Figure 4:
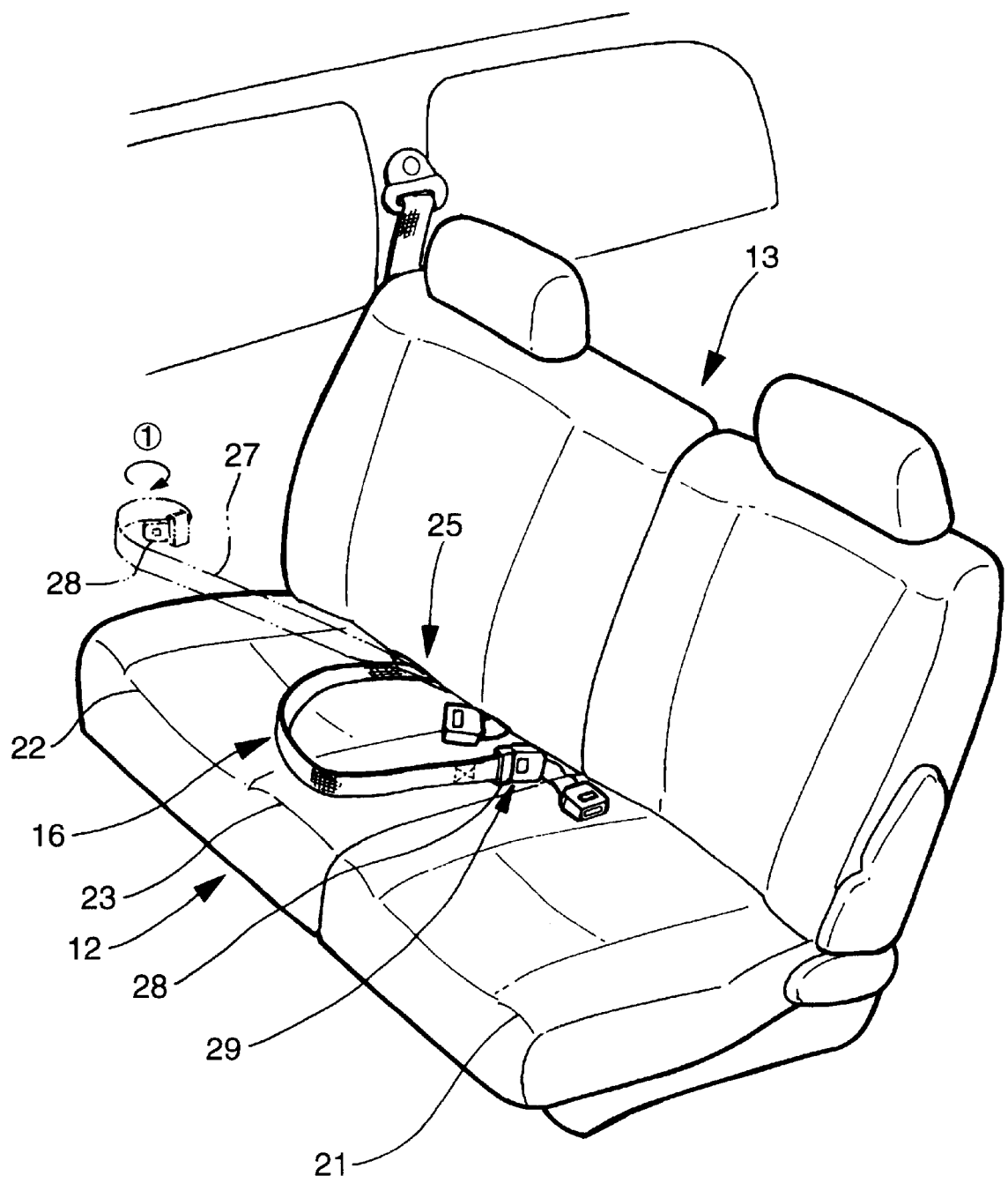
FIG. 4 is a diagram explaining an operation of the seat belt storing structure according to the invention.
Figure 5:
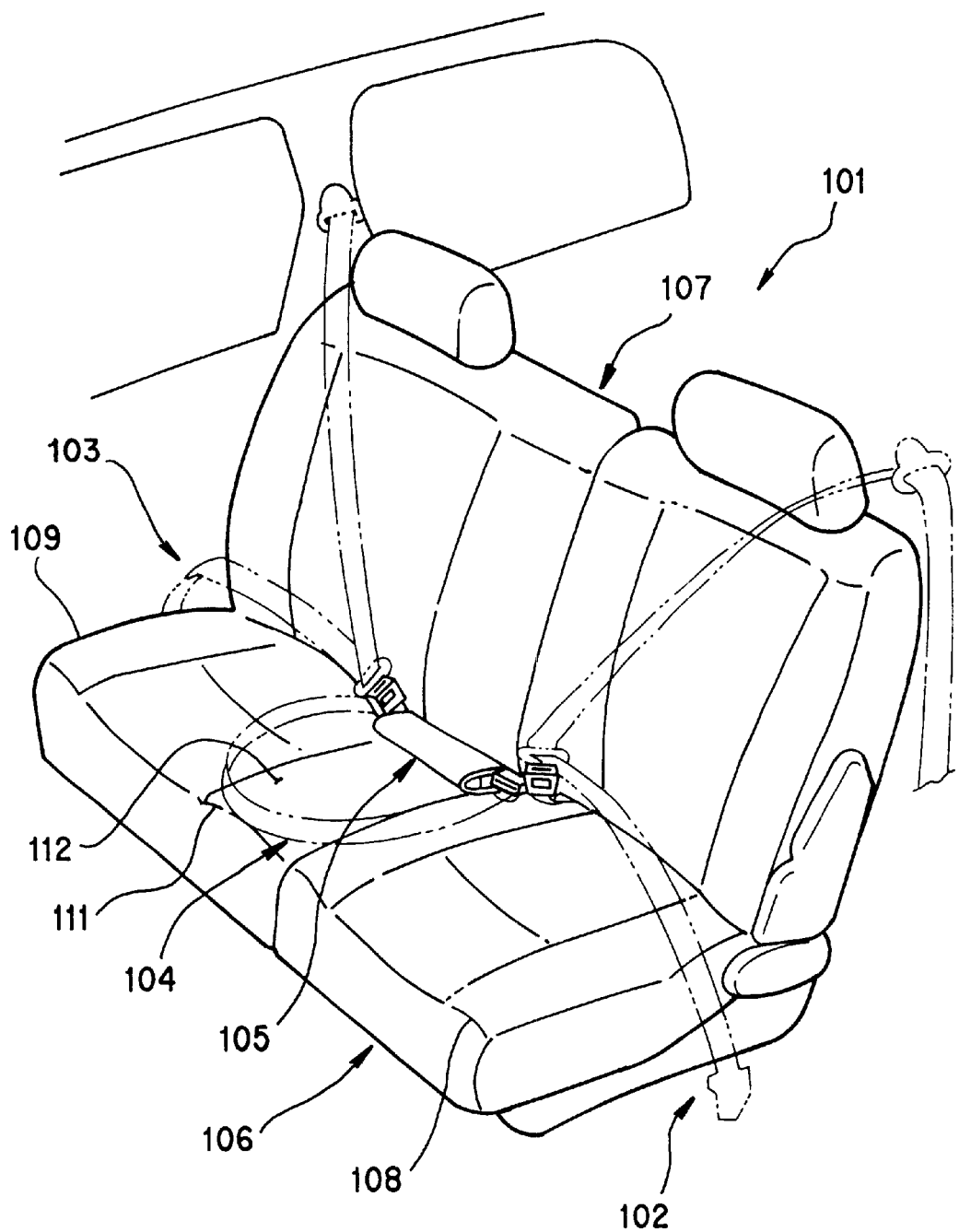
FIG. 5 is a perspective view of a conventional bench seat.

FIG. 4 is a diagram showing an operation of the seat belt storing structure according to the invention.

The tongue plate 28 is removed from the buckle 29 of the seat belt 16 as indicated by imaginary lines, the webbing 27 is wound around the tongue plate 28 as a core as indicated by an arrow ① to such an extent that the webbing 27 wound around the tongue plate 28 reaches the belt storing bag 25, and the webbing 27 and the tongue plate 28 are eventually stored in the belt storing bag 25.

Since the belt storing bag 25 of a predetermined size is attached to the seat cushion back 24 (refer to FIG. 3), the whole of both the webbing 27 and the tongue plate 28 can be stored in the back of the seat cushion 12. As a result, there exists no case where the seat belt 16 (the webbing 27 and the tongue plate 28) appears on any of the left-hand side seat 21, the right-hand side seat 22 and the center seat 23 of the seat cushion 12 (refer to FIG. 1), the external appearance of the seat cushion being thereby preserved.

In addition, since there is left nothing on the seat cushion 12 after the seat belt 16 is worn, the seated comfort of the seat cushion 12 can be preserved.

Furthermore, since the belt storing bag 25 is provided by the lower attaching portion to which one end of the webbing 27 is attached, the whole length of the webbing 27 is wound around the tongue plate 28 for storing in the bag 25. As a result, the popping out of the seat belt 16 (the webbing 27) can be prevented.

Moreover, since the belt storing bag 25 is provided so as to be attached to the seat cushion back 24 (refer to FIG. 3), there is no risk that the belt storing bag 25 comes into the field of view of the occupants of the vehicle or the like. Consequently, there is no need to use an expensive texture for the belt storing bag 25, thereby making it possible to reduce the production cost.

Note that the position of the belt storing bag 25 according to the embodiment of the invention shown in FIG. 1 may be moved from the right-hand side seat 22 to the left-hand side seat 21.

The bench seat shown in FIG. 1 is just an example, and therefore, the invention may be applied to a dividable seat that can be divided by 6 to 4 or a separate seat, and the invention is not limited by the configurations and/or functions (reclining adjustment type, removal type or foldable type) of seats.

In addition, the belt storing bag 25 shown in FIG. 3 may be formed directly on the back of the seat cushion 12.

While only certain embodiments of the invention have been specifically described herein, it will apparent that numerous modifications may be made thereto without departing from the spirit and scope of the invention.

Being constructed as described heretofore, the invention exhibits the following advantages.

According to the first aspect of the invention, since the belt storing bag is provided so as to be attached to the seat cushion back, the whole of both the belt and the tongue plate of the seat belt can be stored therein. As a result, when the seat belt is not in use, there exists no case where the belt and the tongue plate of the seat belt are left appearing on the seat cushion, the external appearance of the seat being thereby preserved.

Additionally, since the belt storing bag is provided so as to be attached to the seat cushion back, when the seat belt is worn, there exists no case where the empty bag is left on the seat cushion as in the case of the conventional belt storing bag, and therefore there is no risk that the occupant feels a foreign feeling at the hip thereof. As a result, the seated comfort of the seat can be preserved.

Furthermore, attaching the belt storing bag to the seat cushion back simultaneously allows the formation of the belt storing bag by the lower attaching portion to which the webbing of the seat belt is attached at one end thereof. As a result, the whole length of the webbing of the seat belt can be wound around the tongue plate, and the whole length of the seat belt can be stored in the belt storing bag. Thus, it is possible to aim at preventing the popping out of the seat belt.

Attaching the seat belt bag to the seat cushion back allows the belt storing bag to be concealed from being viewed. Therefore, there is no need to use an expensive texture, thereby making it possible aim at reducing the production cost.

What is claimed is:

1. A seat belt storage system comprising:
    a horizontal seating member;
    a securing plate;
    a webbing coupled with the securing plate; and
    a receptacle operatively disposed adjacent to the horizontal seating member for storing the securing plate and the webbing, wherein the receptacle is operatively disposed on the back surface of the horizontal seating member.

2. The seat belt storage system according to claim 1, further comprising:
    a cover member for covering a lower attaching portion of the webbing, and
    wherein the receptacle is operatively disposed between the back surface of the horizontal seating member and the cover member.

3. The seat belt storage system according to claim 1, wherein the receptacle is operatively disposed vertically.

4. A seat belt storage system comprising:
    a horizontal seating member;
    a securing plate;
    a webbing coupled with the securing plate;
    a receptacle operatively disposed adjacent to the horizontal seating member for storing the securing plate and the webbing;
    a cover member for covering a lower attaching portion of the webbing, and
    a cover member for covering a lower attaching portion of the webbing, and
    wherein the receptacle is operatively disposed between the back surface of the horizontal seating member and the cover member.

5. The seat belt storage system according to claim 4, wherein the receptacle is operatively disposed vertically.

* * * * *